Dec. 13, 1960 H. KABELITZ 2,963,905
METHOD AND MEANS FOR MEASURING THE PROCESSING
QUALITIES OF SIZING MATERIAL AND THE LIKE
Filed Feb. 28, 1955 2 Sheets-Sheet 1

United States Patent Office 2,963,905
Patented Dec. 13, 1960

2,963,905

METHOD AND MEANS FOR MEASURING THE PROCESSING QUALITIES OF SIZING MATERIAL AND THE LIKE

Hans Kabelitz, M. Gladbach, Rhineland, Germany, assignor to Gebruder Sucker G.m.b.H., M. Gladbach, Rhineland, Germany, a corporation of Germany Filed Feb. 28, 1955, Ser. No. 491,160

Claims priority, application Germany Feb. 27, 1954

13 Claims. (Cl. 73—150)

My invention relates to methods and means for measuring the condition of progressively curing sizing materials for use in textile manufacture. This application is a continuation-in-part of my copending application, Serial No. 353,351, filed May 6, 1953, and now Patent No. 2,801,537, assigned to the assignee of the present invention.

In the manufacture of fabrics, the threads to be woven or otherwise fabricated into a web are first treated with a sizing agent of adhesive character which serves to bond the individual threads together and to smoothen the thread surface. As a rule, such sizing solutions are prepared from starch products with added water and progressively cured by the application of heat. It is important to determine the correct processing stage of such sizes and their suitability for use prior to, or when applying them, to the threads, but this has been a difficult matter.

The heat treatment and the presence of water cause swelling and break-up of the sizing material, and these phenomena attain a maximum at a definite degree of curing or ripening. Best utilization of the sizing properties, therefore, requires an accurate determination of this ripening condition. If the heat treatment of the size is discontinued prior to attaining the ripe or fully cured condition, the starch is not completely broken up. The fiber particles do not bind sufficiently, and the thread may tear under the heavy load occurring on the weaving loom so that the loom must be stopped until the thread break is corrected. On the other hand, if the size is heat treated for an excessive length of time, the starch commences to convert into sugar which likewise reduces the bonding ability and causes similar deterimental results.

It is an object of my invention to provide a method and means for accurately and rapidly determining the ripening condition of the size and its suitability for use without reliance on any particular skill of the operator.

To this end, and in accordance with one feature of the invention, the correct processing and ripening stage of the size is established by a measuring method in which the ripening condition is determined from the adhesive force produced by the size. According to a more specific feature, the method is carried out by measuring the adhesive force in the form of a tear-off or rupture force, preferably by means of a rupture force of measured magnitude.

The instrument for carrying out the herein-disclosed measurements is provided with two wetting blocks. These wetting blocks have confronting plane or spherical test surfaces that match and adhere to each other over a substantial area when the sizing material is inserted therebetween. Sizing material that is to be tested is inserted between the test or wetting surfaces of the blocks and the force necessary to separate the two blocks is measured by means of a dynamometer. Advantageously, a recording device is coupled with the dynamometer to register the amount of rupture force applied at the moment of separation.

If. prior to the separation, the wetting blocks are pressed together each time by applying a constant force, errors caused by differences in the film-thickness of the material between the blocks are avoided. Moreover, it is desirable to provide the measuring instrument with a thermometer which, being inserted into the sizing material while the latter is brought in contact with the wetting blocks, measures the temperature of the sizing material.

According to another feature of my invention, not only the tenacity of adhesion of the sizing material is continuously measured and supervised but, in addition, other physical characteristics such as surface tension, elasticity, ropiness, etc. The respective measurements may be made simultaneously or alternately in rapid sequence and the measured values can be readily compared, particularly if they are registered upon a single strip of chart recording paper. Particularly advantageous is the alternate measuring of adhesion strength and viscosity by means of the same instrument inasmuch as the two values appear then successively on the same recording chart and a correlation therebetween may be made at a single glance. Such measurements are preferably made by tests employing the same general principle, such as pressure tests. I found it particularly advantageous to measure the viscosity when passing sizing material in one direction, and to measure adhesion strength when passing sizing material in the reverse direction through the instrument.

When making the measurements it is advantageous if the individual steps, such as cleaning, wetting of test surfaces, compressing of wetting blocks, applying adhesion disrupting force and readying of instrument for the next test are cyclically performed in such a manner and so related to each other that none of the consecutive steps can be left out.

The values measured by means of the instrument may be transmitted over a distance by means of transmitting means, particularly electric transmitting means, or they may be employed for actuating operative members of the instrument. Thus, the instrument may be provided with a temperature regulating device which, according to the requirements, supplies more or less heat to the sizing trough or stops the heat supply completely.

The measuring instrument can be also built to fully automatically control the preparation of the sizing material.

Devices for processing sizing material are customarily provided with a pump for circulating the sizing solution. The same pump can be used for flowing a test specimen through the herein disclosed measuring instrument. An overflow regulator or any other type of regulator can be provided in order to assure a certain predetermined pressure. It is advantageous, however, to employ a separate reversible pump which flows the sizing agent at first in one direction through the instrument, and then, upon an electrically actuated reversal of the pump motor, in the opposite direction. Water can be pumped through to clean the instrument and to check the throttle orifice of the viscosimeter. For the latter purpose it is desirable to have the pump motor run at a higher speed, say double the speed employed in measurement operation.

For closing the wetting blocks, an electro-magnet can be used, to produce the closing movement either alone or aided by atmospheric pressure utilizing the suction effect of sizing agent flowing between the wetting blocks in a direction to urge them together. The magnet can be actuated by an impulse source emitting impulses of equal magnitude within regular time intervals. The impulse source may be coupled with the advancing mechanism for the chart strip of the recording device or may comprise one element jointly therewith. Moreover, it is advantageous to provide an impulse source adapted to also govern the forward and backward operation of the pumping motor within adjustable time intervals. The timing cycle of the operation of the motor is to be regulated by the sequence of said impulses, transmitted, if necessary, through a motor control contactor. The arrangement should permit adjustment of the individual time intervals independently of each other.

In order to appropriately distinguish between the two coordinated measuring results, particularly if they are not of equal scale magnitudes, it is sometimes advisable to employ, as part of the recording instrument or inserted into the measuring circuit, scale modifying means for distorting or altering one of the recorded readings. A shift in the scale, such as offsetting the zero position, is appropriate for this purpose. Thus, when testing the adhesion strength, a higher spring pressure may be employed within the measuring gauge than when testing the viscosity or vice versa. Alternatively, in case of electric measuring instruments, resistances, particularly non-linear resistances, may be inserted in parallel or in series into the measuring circuit in order to accentuate individual readings.

The invention will be more clearly understood when reading the following description of a preferred embodiment in conjunction with the accompanying drawings, in which.

Figure 1:
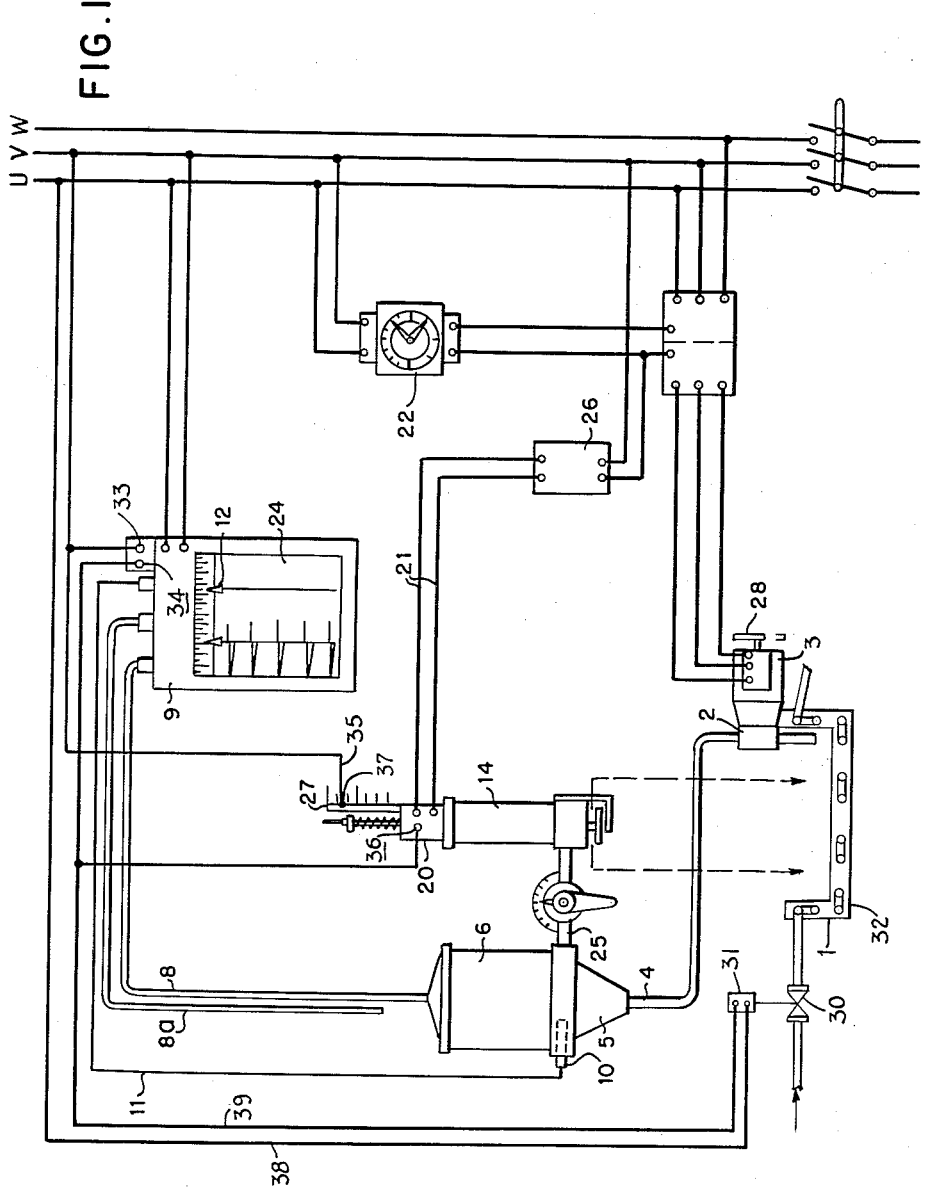
Fig. 1 is a schematic illustration of the entire instrument.
Figure 2:
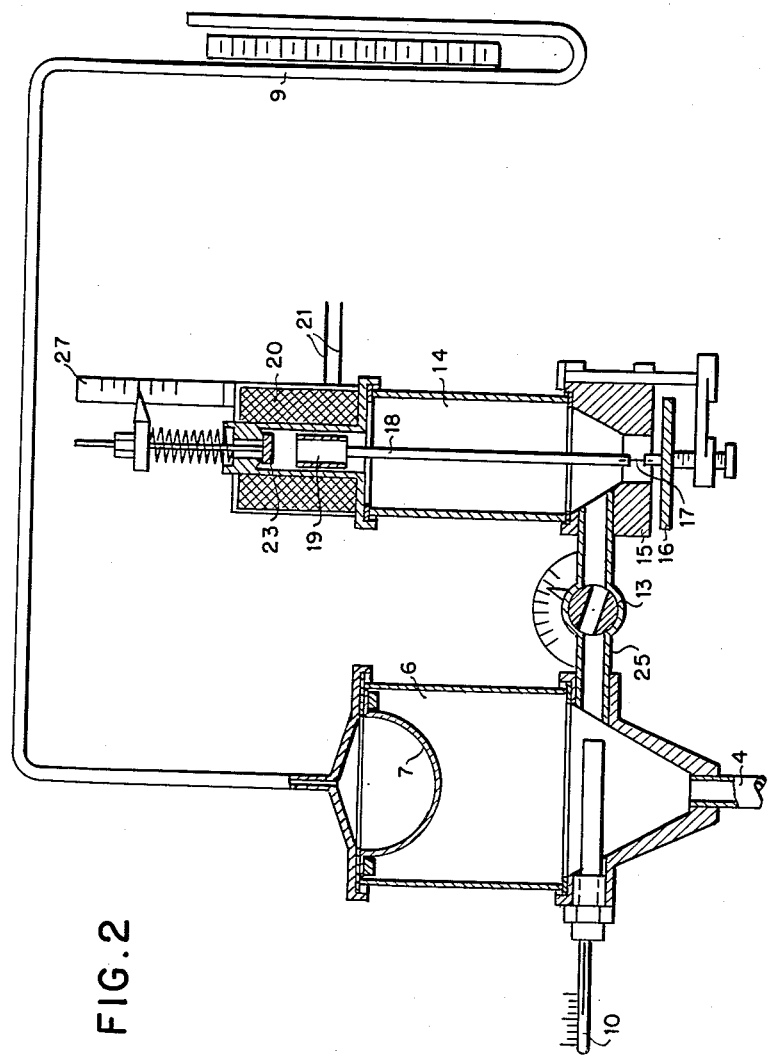
Fig. 2 illustrates the construction of the principal elements of the instrument.

Referring in more detail to the drawings, the numeral 1 indicates a heated trough for progressively curing sizing material. By means of a pump 2, driven by a reversible motor 3, sizing material is pumped through the conduit 4 into a measuring device 5. Inserted into the pressure chamber 6 of the measuring device is a hollow, elastic sphere or pressure diaphram 7, the interior of which, by means of the connecting tube 8, communicates with a pressure recorder 9. In order to compensate for errors, a compensation tube 8a, connected with the recorder, is provided according to known principles. A thermometer 10, connected by means of a lead 11 to a temperature recorder 12, is provided to indicate the temperature of the sizing material within the chamber 6. If desired, a common strip chart 24 may be provided for registering the foregoing two readings. A discharge conduit 25 and an adjustable throttle valve 13 connect the chamber 6 with an adhesion dynamometer 14. After passing the metering orifice provided by the adjustable throttle, a portion of the material reaches the wetting blocks 15, 16, in order to pass into the space provided therebetween and to return again at atmospheric pressure to the trough 1. By means of an elastic wire 17 and the rod 18, the lower wetting block 16 is connected with the iron core 19 of a solenoid 20. This solenoid is periodically energized by an impulse source or timer 22, the two being connected with each other by leads 21, with a slip-contact impulse relay 26 inserted therein. Energization takes place at regularly spaced predetermined time intervals. Moreover, the motor 3 is wired in such a manner that its rotation reverses synchronously with every momentary energization of the solenoid. The time periods of forward and reverse action of the motor can be adjusted independently of each other. The advancing mechanism for the paper strip chart of the recording device 9 is preferably moved by the timer or impulse source 22, by means of mechanical links, such as a shaft, or other connecting means, attached therebetween and the impulse source.

The first step in operating the device is to charge the measuring chamber 6 with sizing material from trough 1 through conduit 4. The throttle valve 13 is adjusted to provide a metering orifice of small cross sectional area in comparison to the area of conduit 4. This arrangement provides that the discharge rate of sizing material accumulating within the measuring chamber depends, in part, upon the viscosity of the material. The rubber hemisphere 7, suspended from the top of the measuring chamber, is compressed by the pressure increase occurring as a result of pumping sizing material into the pressure chamber and transmits this pressure through the connecting tube 8 to the pressure recorder 9. Inasmuch as this pressure is proportionally equal to the viscosity, it can be used directly for determining the viscosity. The adjustment of the cross sectional area of the throttle valve 13 permits adaptation of the device for various types of sizing and wide variations of viscosity. Because of the continuous pumping action, the sizing cannot settle so as to clog the conduits, the pressure measuring chamber 6 or the dynamometer chamber 14. After passing the throttle valve 13, the sizing is discharged from between the wetting blocks 15 and 16.

After a short time, for example after 3 minutes, the impulse source 22 reverses the motor 3 and the pump 2 so that the latter sucks sizing material downwardly through the conduit 4. Simultaneously with this flow reversal, the solenoid 20 receives an impulse through the lead 21 and the slip relay 26, which causes an upward motion of the iron core 19 of the solenoid and of the wetting block 16, after which the impulse ceases. Because of an instantaneously occurring suction effect, the movable test block 16 is drawn upwardly and adheres to the fixed test block 15 and a partial vacuum occurs. In order to measure the pressure drop, an adjustable vacuum valve 23 is mounted above the iron core 19, the readings of which valve may be taken with the aid of a scale 27.

After this short suction step, the impulse source 22 reverses the motor once more and sizing material enters again into the measuring chamber 6. Because the wetting block 16 sticks to the wetting block 15, there is at first a temporary pressure excess within the measuring chamber 6. By means of the rubber hemisphere 7, this pressure excess is transmitted to the recorder 9. The moment this pressure reaches a peak value which corresponds to the adhesive force between their confronting test surfaces, the wetting block 16 separates from the wetting block 15 and the initial conditions are reestablished.

In order to check and calibrate the action of the measuring instrument and for purposes of cleaning the same, according to another aspect of this invention, water or another cleaning fluid is pumped from time to time through the instrument, say after termination of one set of tests on a particular batch of sizing. If, by increasing the speed of the pump or by an appropriate throttling of the valve 13 the measuring instrument is adjusted to the viscosity of, say, water, the value obtained with water may be used for calibrating and checking the operation and adjustment of the instrument in one operation with cleaning the same. Not only the accuracy of the instrument is checked in this manner, but its state of cleanliness is assured as well. In order to adjust the instrument to the changed operating conditions if water is passed therethrough, a control switch 28 is provided for the pump drive motor 3. This switch may be also coupled with a turn-off for the instrument, particularly with turn-off for the heating device and the conveying means for the sizing material. The means for returning sizing material into the stock reservoir are also suitable for this purpose.

It is stated above that the values measured by the instrument may be employed for actuating operative members of the instrument, and that the instrument may be provided with a temperature regulating device, which supplies heat to the sizing trough according to requirements, or stops the heat supply completely. Any conventional apparatus can be employed for this. For example, heating fluid supplied to a size heating pipe 32 is controlled by a valve 30 which is automatically operated by a conventional magnetically operated valve control device 31. Device 31 is connected across a phase of the power lines through contacts 36 and 37 on the adhesive-force measuring device 14, or through contacts 33, 34 on the pressure recorder 9 of the viscosity measuring device. These contacts are of a conventional type adjustable for setting circuit closure at the desired maximum value. When either of the two sets of contacts is closed, the supply of heating fluid is shut off. For example, contact 37 is a contact which at the maximum value of the adhesive force causes closing of the circuit through contact 36, lines 38, 39 and magnetic control device 31, to shut off the supply of heating fluid. Contacts 33, 34 function in a similar manner through the parallel connection.

The afore-described measuring process is applicable not only in connection with sizing material. Other materials, such as printing inks, thickeners, weighting or improving agents and other liquid or semi-liquid textile auxiliary materials may be checked and measured in this manner in order to adjust and standardize them. As a result of such continuous supervision and checking of the characteristics of the respective materials, their preparation is substantially simplified and standardized. Consequently, the instrument can be also used for measuring the homogeneity of materials of the afore-described type.

I claim:

1. A system for determining the viscosity and sticking properties of a liquid comprising a source means for the liquid, propelling means to draw the liquid from the source means, measuring chamber means into which the liquid so drawn is conducted, means sensing variations in pressure in the said chamber caused by inflow of said liquid, means providing a passage in communication with said chamber and into which liquid drawn from said source is passed by the propelling means, the passage means providing a metering orifice for said passage, and a second chamber into which the liquid flows from said orifice, the orifice being of such diameter that the pressure sensed is correlated with respect to the viscosity of the liquid, said second chamber having an outlet for liquid, two testing members having juxtaposed mutually displaceable stickiness testing faces, said faces when apart forming a passage communicating with the outlet of the second chamber for passage of sizing material therefrom, said propelling means being adapted for intermittently moving the liquid through said orifice into said second chamber to be fed between the two testing members, means to cause the two testing surfaces to contact each other, the propelling means being operative to intermittently withdraw the liquid from said second chamber and to then force the liquid into the measuring chamber and also through the said orifice into the second chamber and from the outlet thereof between the two testing members to force them apart, the pressure sensing means thereupon sensing the liquid pressure required to force the two testing members apart, said liquid pressure being commensurate with the sticking properties.

2. A system for determining the viscosity and sticking properties of a liquid comprising a source means for the liquid, pump means to dray the liquid from the source means, measuring chamber means into which the pump means forces the liquid so drawn, means sensing variations in pressure in the said chamber caused by inflow of said liquid, a duct in comunication with said chamber and into which liquid drawn from said source is forced by the pump means, means providing a metering orifice of variably settable diameter for said duct, and a second chamber into which the liquid flows from said orifice, the orifice being settable so that the pressure sensed is correlated with respect to the viscosity of the liquid, said second chamber having a liquid outlet, two testing members having juxtaposed mutually displaceable stickiness testing faces, said faces when apart forming a passage communicating with the outlet of the second chamber for passage of sizing material therefrom, said pump means being operative to intermittently force the liquid through said orifice into said second chamber and, from said liquid outlet, between the two testing members, means to intermittently dispose the two testing surfaces together with a layer of liquid in between, said pump means being operative to intermittently withdraw the liquid from said second chamber to then force the liquid into the measuring chamber and also through the said orifice into the second chamber and between the two testing members to force them apart, the pressure sensing means thereupon sensing the liquid pressure required to force the two testing members apart, said liquid pressure being commensurate with the sticking properties.

3. The apparatus defined in claim 2, said liquid being heated liquid size, and means for controlling the heat supplied to the size, said means being governed by the pressure sensing means.

4. A system for determining the viscosity and sticking properties of a liquid comprising a source means for the liquid, pump means to draw the liquid from the source means, measuring chamber means into which the pump forces the liquid so drawn, means sensing variations in pressure in the said chamber caused by inflow of said liquid, means providing a passage in communication with said chamber and into which liquid drawn from said source is forced by the pump, said passage means providing a metering orifice for said passage, and a second chamber into which the liquid flows from said orifice, the orifice being of such diameter that the pressure sensed is correlated with respect to the viscosity of the liquid, said second chamber having an outlet, two testing members having juxtaposed mutually displaceable stickiness testing faces, said faces when apart forming a passage communicating with the outlet of the second chamber for passage of sizing material therefrom, said pump means being operative to intermittently force the liquid through said orifice into said second chamber and to be fed from said chamber outlet between the two testing members, at least one of the two testing faces being movable toward the other, said pump means being operative to intermittently suck the liquid from said second chamber back through said orifice, the pump thereby applying suction to move said one face toward the other face, said pump means being operative thereafter to again force the liquid into the measuring chamber and also through the said orifice into the second chamber and from the latter between the two testing members to foce them apart, the pressure sensing means sensing the liquid pressure required to force the two testing members apart, said liquid pressure being commensurate with the sticking properties.

5. A system for determining the viscosity and sticking properties of a liquid comprising a source means for the liquid, pump means to draw the liquid from the source means, measuring chamber means into which the pump forces the liquid so drawn, means comprising a flexible diaphragm sensing variations in pressure in the said chamber caused by inflow of said liquid, indicater means operated by the pressure sensing means, a duct in communication with said chamber and into which liquid drawn from said source is forced by the pump, means providing a metering orifice of variable settable diameter for said duct, and a second chamber into which the liquid flows from said orifice, the orifice being settable so that the indication of said indicating means is correlated with respect to the viscosity of the liquid, said second chamber having an outlet, two testing members having juxtaposed mutually displaceable stickiness testing faces, said faces when apart forming a passage communicating with the outlet of the second chamber for passage of sizing material therefrom, said pump means being operative to intermittently force the liquid through said orifice into said second chamber to be fed from the outlet thereof between the two testing members, at least one of the two testing faces being movable toward the other, said said pump means being operative to intermittently suck the liquid from said second chamber back through said orifice, the pump thereby applying suction to move said one face toward the other face, said pump means being operative to thereafter again force the liquid into the measuring chamber and also through the said orifice into the second chamber and from the latter between the two testing members to force them apart, the pressure sensing means sensing the liquid pressure required to force the two testing members apart, said liquid pressure being commensurate with the sticking properties.

6. A system for determining the viscosity and sticking properties of a liquid comprising a source means for the liquid, propelling means to draw the liquid from the source means, measuring chamber means into which the liquid so drawn is conducted, means sensing variations in pressure in the said chamber caused by inflow of said liquid, said sensing means including a flexible diaphragm in the upper portion of the measuring chamber, and means operably connected thereto to indicate variations to the pressure above the liquid level in said chamber, means providing a passage in communication with said chamber and into which liquid drawn from said source is passed by the propelling means, and providing a metering orifice for said passage, and a second chamber into which the liquid flows from said orifice, the orifice being of such diameter that the pressure sensed is correlated with respect to the viscosity of the liquid, said second chamber having an outlet, two testing members having juxtaposed mutually displaceable stickiness testing faces, said faces when apart forming a passage communicating with the outlet of the second chamber for passage of sizing material therefrom, said propelling means being operative to intermittently move the liquid through said orifice into said second chamber and to be fed therefrom between the two testing members, means to cause the two testing faces to contact each other, the propelling means being operative to intermittently withdraw the liquid from said second chamber, and to then force the liquid into the measuring chamber and also through the said orifice into the second chamber and from the latter between the two testing members to force them apart, the pressure sensing means thereupon sensing the liquid pressure required to force the two testing members apart, said liquid pressure being commensuate with the sticking properties.

7. Device for determining and recording the viscosity, adhesive power and temperature of sizing material prepared for application to textile goods, which comprises a reversible pump adapted for delivery of a flowing specimen of said sizing material, a reversible motor for driving said pump, a power supply for said motor, a measuring chamber connected to receive delivery of said specimen, a pressure sensitive member within said chamber, a thermometer comprising a thermally sensitive member within said measuring chamber, a recorder connected with said thermally sensitive member and said pressure sensitive member and employing a common chart for recording pressure and temperature adjacent one another, a device providing a second chamber and two confronting mutually displaceable wettable surfaces at least one of which is movable, said second chamber having an outlet, said surfaces when apart forming a passage communicating with the outlet of the second chamber for passage of sizing material therefrom, a discharge conduit connecting said measuring chamber to said second chamber, an adjustable throttle valve connected in said discharge conduit, electro-magnetically actuated means for moving one of said wettable surfaces intermittently into passage closing contact with the other, an adjustable vacuum valve for admitting atmospheric air to said second chamber, adjustable timing means adapted for connecting said motor to said power supply for operation of said pump to pump sizing material into said measuring chamber for an adjustably predetermined length of time, and for reversing said motor for another length of time for sucking sizing material from both said chambers while simultaneously actuating said electro-magnetically actuated means, and thereafter for reversing said motor again to pump sizing material into said measuring chamber until the pressure increment in said chamber becomes sufficient to separate said movable wetting surface from closing contact with said other wetting surface, said chart recording the peak pressure required for said separation.

8. The method of testing the ripening state of a progressively curing sizing solution to determine its suitability for use by the measurement of its tenacity, said method comprising the steps of: withdrawing a test specimen from a batch of said solution which is being cured; forcing said specimen under pressure between two cooperating confronting separable test surfaces, and out into a surrounding gaseous medium of substantially constant pressure, said flow urging said confronting surfaces apart; applying suction to reverse the direction of flow of sizing to relatively draw said surfaces together by the resulting differential pressure of said gas medium with respect to said suction, said surfaces adhering together with a force at least in part determined by the adhesive tenacity of said sizing solution; again reversing said flow to separate said surfaces by pressure of said solution, and determining the latter pressure to obtain a measure of the stickiness and ripening state of the solution, and measuring the temperature and the viscosity of the solution contemporaneously with the determination of the stickiness.

9. The method of testing the ripening state of a progressively curing adhesive sizing solution to determine its suitability for use, said method comprising the steps of: withdrawing a test specimen from a batch of said solution; flowing said specimen under pressure between two cooperating test surfaces in a direction to urge said surfaces apart, said flowing specimen being discharged into the atmosphere; applying suction to reverse the direction of said flow for relatively drawing said surfaces together by the resulting differential pressure, said test surfaces being pressed together, with a film of said specimen therebetween, by said pressure differential, between atmospheric pressure and the sub-atmospheric pressure accompanying said application of suction, discontinuing said flow and said suction, said surfaces adhering to each other by a force determined by the adhesive tenacity of said sizing solution; and separating said adhering surfaces by a measured rupture force, the magnitude of said rupture force being a measure of the tenacity of said solution.

10. The method of testing the ripening state of a progressively curing sizing solution to determine its suitability for use by the measurement of its tenacity, said method comprising the steps of: withdrawing a test specimen from a batch of said solution which is being cured; flowing said specimen under pressure into a surrounding gaseous medium of substantially constant pressure between two cooperating confronting separable test surfaces, said flow urging said confronting surfaces apart; applying suction to reverse the direction of said flow to draw said surfaces together by the resulting differential pressure of said medium and said suction, thereby causing said surfaces to adhere together with a force at least in part determined by the adhesive tenacity of said sizing solution; again reversing said flow to separate said surfaces by pressure of said solution, and determining the latter pressure to obtain a measure of the stickiness and ripening state of the solution.

11. The method of testing the ripening state of a progressively curing sizing solution to determine its suitability for use by the contemporaneous measurement of its tenacity and viscosity, said method comprising the steps of: forcing a continuously flowing test specimen of said solution which is being cured into a pressure chamber, measuring the pressure exerted by the solution in said chamber, said fluid being flowed at a predetermined flow rate; flowing said specimen under said pressure through a metering orifice to determine its viscosity by the magnitude of said measured pressure; flowing said specimen after its emergence from said orifice between a pair of cooperating confronting separable test surfaces in a direction to urge said confronting surfaces apart, said last named flow being into the atmosphere; applying suction to reverse the direction of said flow to draw said surfaces together by reason of the resulting differential pressure; discontinuing said flow; said surfaces adhering together with a force at least in part determined by the adhesive tenacity of said sizing solution; and, with said flow discontinued, separating said surfaces by means of a measured rupture force, the magnitude of said force being a measure of the tenacity of said solution.

12. The method according to claim 11, wherein the flowing steps thereof are performed with said specimen at a measured temperature.

13. An apparatus for preparing starch size comprising a vessel for ripening starch by heating it in water, an automatic device for withdrawing a test specimen from the body of ripening starch in said vessel, and for automatically making tests of the viscosity and stickiness of the specimen, said means for automatically making tests comprising a viscosity sensing means and a stickiness sensing means, and passageway means connected to said vessel and to said sensing means for flow of the test specimen from said vessel through both said sensing means, means for moving the specimen through said passageway, and viscosity sensing means sensing the force required to move the specimen through said passageway, and means governed by the so determined viscosity and stickiness to automatically control the heat supply to the ripening starch in said vessel.

References Cited in the file of this patent
UNITED STATES PATENTS

| | | |
|---|---|---|
| 2,345,968 | Green | Apr. 4, 1944 |
| 2,557,341 | Carrier | June 19, 1951 |
| 2,696,734 | Brunstrum | Dec. 14, 1954 |

FOREIGN PATENTS

| | | |
|---|---|---|
| 804,153 | France | July 27, 1936 |